(12) United States Patent
Diekevers

(10) Patent No.: US 10,239,600 B2
(45) Date of Patent: Mar. 26, 2019

(54) MARINE PROPULSION ASSEMBLY UTILIZING A DUAL OPPOSED THREADED DRIVE SHAFT WITH TAPER

(71) Applicant: Acme Marine Group, LLC, Big Rapids, MI (US)

(72) Inventor: Todd Diekevers, Big Rapids, MI (US)

(73) Assignee: AMG Operations, LLC, Big Rapids, MI (US)

( * ) Notice: Subject to any disclaimer, the term of this patent is extended or adjusted under 35 U.S.C. 154(b) by 524 days.

(21) Appl. No.: 14/920,004

(22) Filed: Oct. 22, 2015

(65) Prior Publication Data

US 2017/0113774 A1  Apr. 27, 2017

(51) Int. Cl.
| | |
|---|---|
| *B63H 23/34* | (2006.01) |
| *B63H 1/14* | (2006.01) |
| *B63H 1/20* | (2006.01) |
| *F16D 1/08* | (2006.01) |

(52) U.S. Cl.
CPC ............. *B63H 23/34* (2013.01); *B63H 1/14* (2013.01); *B63H 1/20* (2013.01); *F16D 1/0876* (2013.01); *B63B 2749/00* (2013.01)

(58) Field of Classification Search
CPC .. B63H 23/34; B63H 1/14; B63H 1/20; F16D 1/09; B63B 2749/00
See application file for complete search history.

(56) References Cited

U.S. PATENT DOCUMENTS

| | | | | |
|---|---|---|---|---|
| 3,307,634 A | * | 3/1967 | Bihlmire | B63H 1/20 384/215 |
| 3,563,670 A | * | 2/1971 | Knuth | B63H 1/20 416/133 |
| 4,144,755 A | * | 3/1979 | Palloch | F16H 55/36 403/16 |
| 4,695,183 A | | 9/1987 | Greenberg | |
| 4,993,151 A | * | 2/1991 | Steiner | B63H 23/34 29/428 |
| 5,759,074 A | * | 6/1998 | Jones | B63H 11/08 416/244 B |
| 7,223,076 B2 | * | 5/2007 | Mansson | B63H 23/34 416/204 R |
| 7,641,528 B2 | | 1/2010 | Stolper | |
| D682,186 S | * | 5/2013 | Gilk | D12/214 |
| 8,911,272 B1 | | 12/2014 | Gilk et al. | |
| 2006/0165531 A1 | * | 7/2006 | Mansson | B63H 23/34 416/244 B |

FOREIGN PATENT DOCUMENTS

NL  102293 C  3/1962

* cited by examiner

*Primary Examiner* — Eldon T Brockman

(57) ABSTRACT

A marine propulsion assembly includes a propeller having a threaded hub whose threads are used for engaging with a drive shaft. The drive shaft includes both a first set of threads and second set of threads such that the first set of threads are used to engage with a keeper nut and a second set of threads are used to engage within the propeller hub. The first set of threads are configured to be opposite the direction of propeller rotation for preventing rotation of the keeper nut while the second set of threads are configured opposite the direction of rotation of the propeller to prevent the propeller from loosening on the drive shaft. The drive shaft further includes a tapered section for providing a stop to the propeller when engaging with the second set of threads.

7 Claims, 4 Drawing Sheets

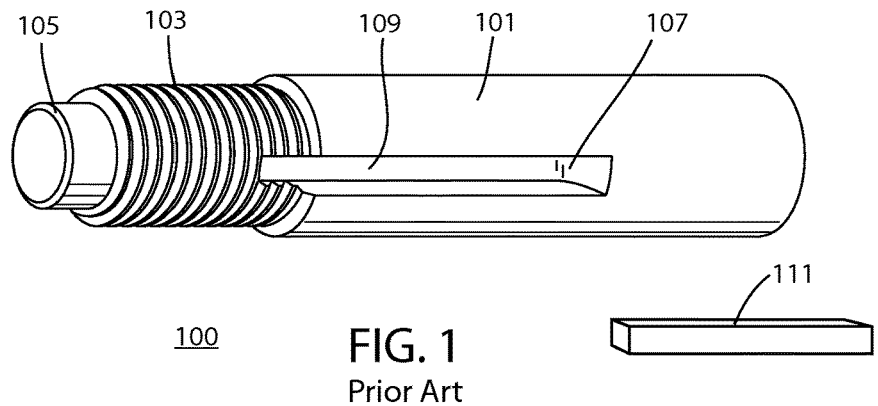
100   FIG. 1
Prior Art
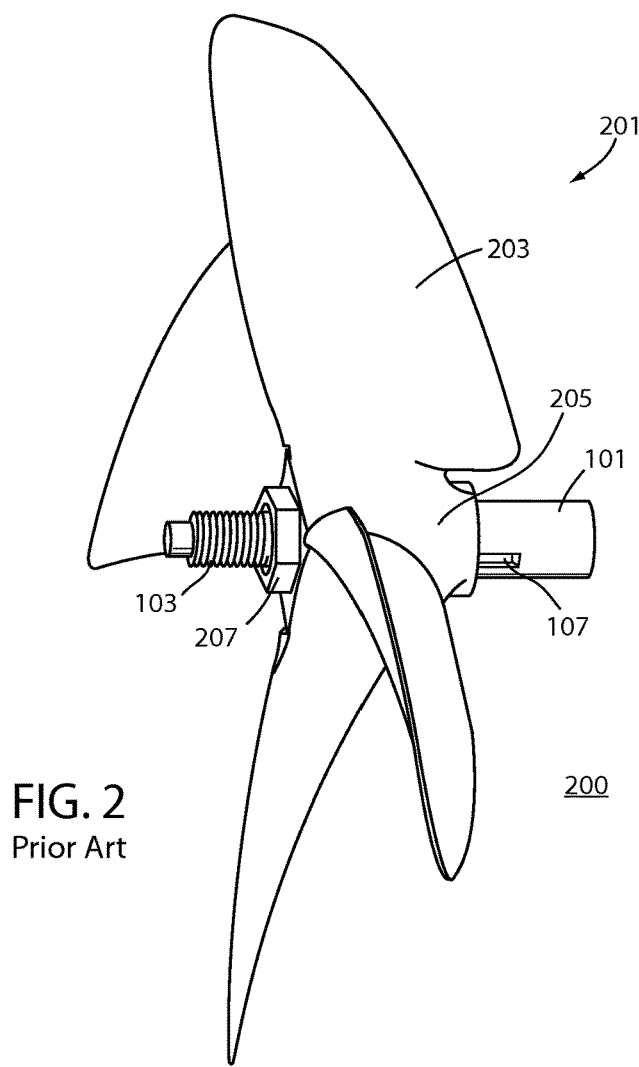
FIG. 2
Prior Art
200

MARINE PROPULSION ASSEMBLY UTILIZING A DUAL OPPOSED THREADED DRIVE SHAFT WITH TAPER

FIELD OF THE INVENTION

The present invention relates generally to marine propulsion and more particular to a marine propeller and drive shaft assembly for use with Direct Drive/V Drive and Stern Drive marine engines utilizing drive shafts.

BACKGROUND

When used with marine propulsion systems, a drive shaft or propeller shaft (prop shaft) is a mechanical component used for transmitting torque and rotation to one or more marine propellers. The drive shaft connects components of the drive train, such as the marine motor, that cannot be connected directly to the propeller because of distance needed for allowing relative movement between these components. As a torque carrier, the drive shaft is subject to torsion and shear stress, equivalent to the difference between the input torque and the load. The drive shaft must be strong enough to bear the stress, whilst avoiding too much additional weight that would in turn increase its inertia.

On a power-driven boat or ship, the drive shaft usually connects the transmission inside the vessel directly to the propeller, passing through a stuffing box or other seal at the point it exits the hull. The shaft connects through the propeller where is it fastened with a keeper nut at its end. The shaft typically includes a keyway, so that a key may be wedged into the keyway for tightly engaging the shaft into the hub of the propeller. A problem often occurs during installation if the key does not seat properly within the keyed slot of the propeller and the keyed slot of the shaft. Should the key slide forward and ride up the radius of the keyed slot in the shaft, it will create a pinching of the key and the keyed slot of the propeller forcing non fit/misalignment thus causing drive shaft vibration, loss of torque and drive shaft strength.

SUMMARY OF THE INVENTION

A marine propulsion assembly includes a propeller having a thread hub and taper bore. A drive shaft has a tapered cylindrical body and is used with the propeller. A first end of the drive shaft has a first diameter while a second end of the drive shaft has a second diameter that is greater than the first end. A first set of threads are located at the first end of the drive shaft for use in engaging a keeper nut. A second set of threads are located adjacent the first set of threads for engaging within a propeller hub. The first set of threads have a left hand thread and are configured to be consistent with the direction of propeller rotation for preventing rotation of the keeper nut. The second set of threads have a right hand thread and are configured opposite the direction of rotation of the propeller to prevent the propeller from loosening on the drive shaft. The drive shaft further includes an increased taper located adjacent the second set of threads for engaging the tapered bore within the propeller hub where the increased taper acts as a stop for a propeller mounted to the shaft.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 1 is a side view showing a prior art drive shaft with keyway.

FIG. 2 is a side view showing a marine propulsion assembly in accordance with the prior art.

Figure 3A:
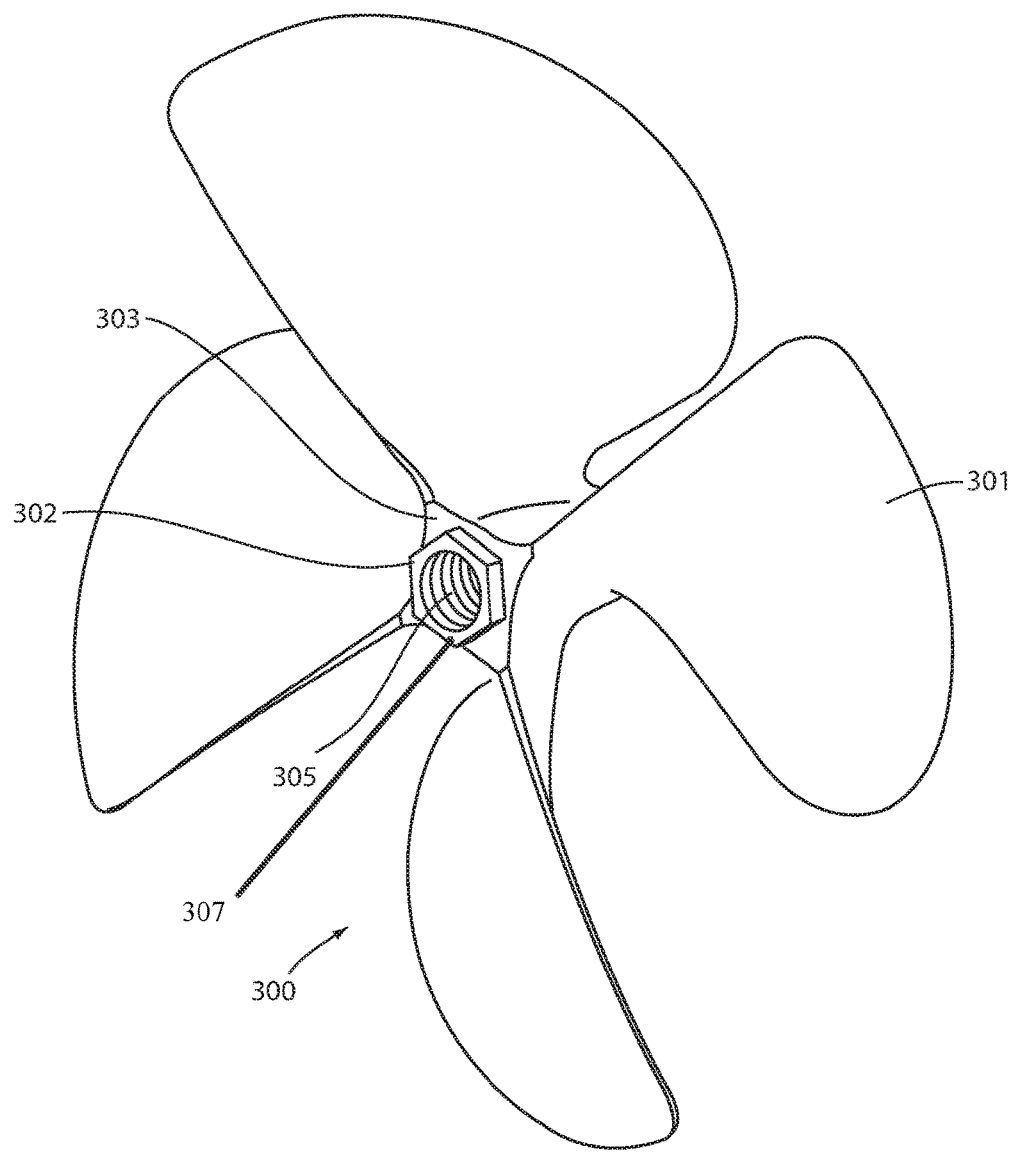
FIG. 3A and FIG. 3B are a front perceptive view and rear perspective view respectively of a propeller used in the marine propulsion assembly.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a marine propulsion assembly. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Those skilled in the art will recognize that a marine propeller is driven by a combination of torque applied to a propeller shaft as well as the torque developed by the jet momentum reaction which occurs as a result of the discharge of jets from the trailing edges of the propeller blades. Propellers driven by drive shaft torque 'or jet momentum reaction generated by fluid discharge from the blades, as well as a combination of the two, are known in the art. In all cases, however, the total lift force which can be generated by the blades is limited by the phenomena of cavitation and/or separation of the liquid operating medium from the surfaces of the blades. The propeller blades are critically shaped in width, length and angle of discharge so that their velocity in the water in the vicinity of the trailing edges works to produce a super-circulation of the water to produce thrust.

All of these parameters are critical so as to avoid the dangers and decreased efficiencies associated with cavitation and/or separation associated with high blade loadings.

FIG. 1 is a side view showing a drive shaft with keyway as typically used in the prior art. Those skilled in the art will recognize that for a key to function, the shaft and rotating machine element, i.e. the propeller, must include a keyway and a keyseat. The keyway and keyseat are the slot and pocket in which the key fits. This mechanical arrangement is typically called a keyed joint. A keyed joint allows relative axial movement of the propeller on the shaft without movement between the parts. As seen in FIG. 1, the drive shaft 100 includes a cylindrical shaft 101 and a threaded top portion 103. As seen in FIG. 2, the threaded top portion is used with a keeper nut 207, the thread is typically left handed so that a retaining nut's tightening rotation in the same direction of rotation of the drive shaft 100 keeping it tight on the shaft. A keyway 107 and keyseat 109 are cut into one side of the shaft 101 to a predetermined depth. A key 111 is then frictionally engaged within the keyway that works to hold the propeller to the shaft in a rigid position.

As seen in FIG. 2, a side view is shown of a marine propulsion assembly using the prior art drive shaft shown in FIG. 1. The marine propulsion assembly 200 includes the drive shaft 101 the drives the propeller 20 in a rotational motion. The propeller includes a plurality of blades 203 joined at a hub 205. The drive shaft 101 extends though the hub 205 where the threaded top portion 103 of shaft 101 is secured using a keeper nut 207. A key and keyway 107 are typically used to secure the shaft 101 to hub 205.

Figure 3B:
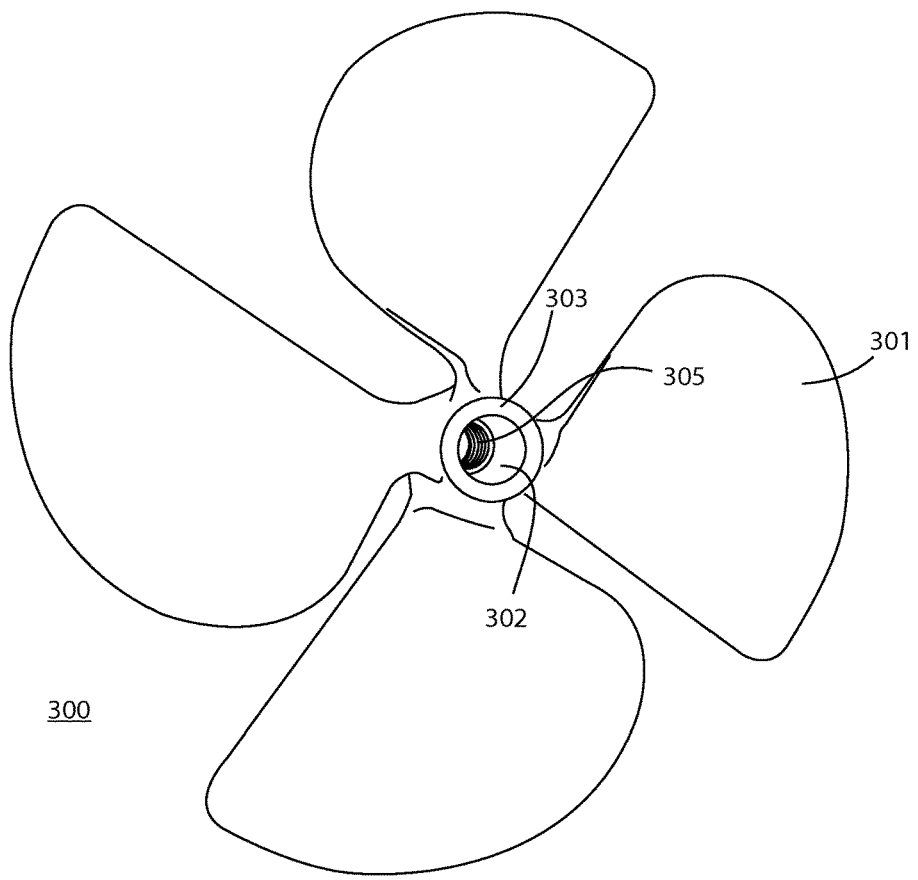

FIG. 3A and FIG. 3B are front and rear perceptive views respectively of the propeller used in the marine propulsion assembly according to various embodiments of the invention. With regard to both FIGS. 3A and 3B, the propeller 300 is typically manufactured of a nickel aluminum bronze 958 alloy and includes a plurality of blades 301 which connect a center hub 303. A threaded hole 305 extends though the center hub 303. FIG. 3B shows a tapered bore 302 located on the forward side of threaded hole 305, and is used for mating with a plurality of threads on the drive shaft as described herein. Further, FIG. 3A specifically shows the aft or "pressure face" of the propeller where an installation/dismount nut such as hexagonal nut 307 is integrated within the aft end of the center hub 303. The hexagonal nut 307 allows for the simple installation or removal of the propeller 300 since the propeller can be easily twisted off the shaft without the use of specialty tools. Thus, the hexagonal nut 307 enables the propeller 300 to be installed or removed from a drive shaft with only an open end or socket wrench. Although FIG. 3A illustrates the use of a hexagonal type nut, those skilled in the art will recognize that other types of fastening devices can also be integrated into the center hub 303. These might include but are not limited to square or rectangular threaded bolts that will also work to prevent the propeller 300 from any undesired motion on threads on a drive shaft.

Figure 4:
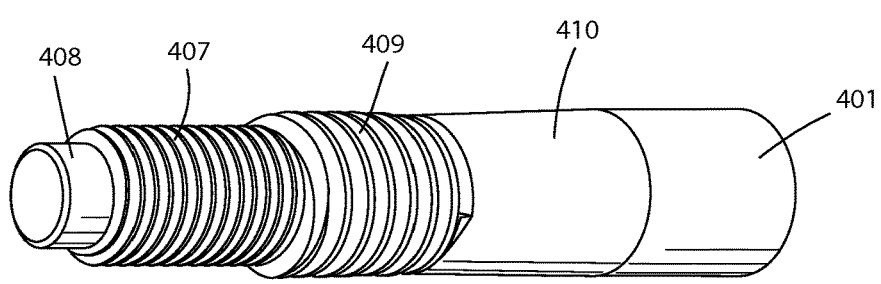
FIG. 4 is a perspective view of the drive shaft having dual opposing threads used in the marine propulsion assembly.
Figure 5:
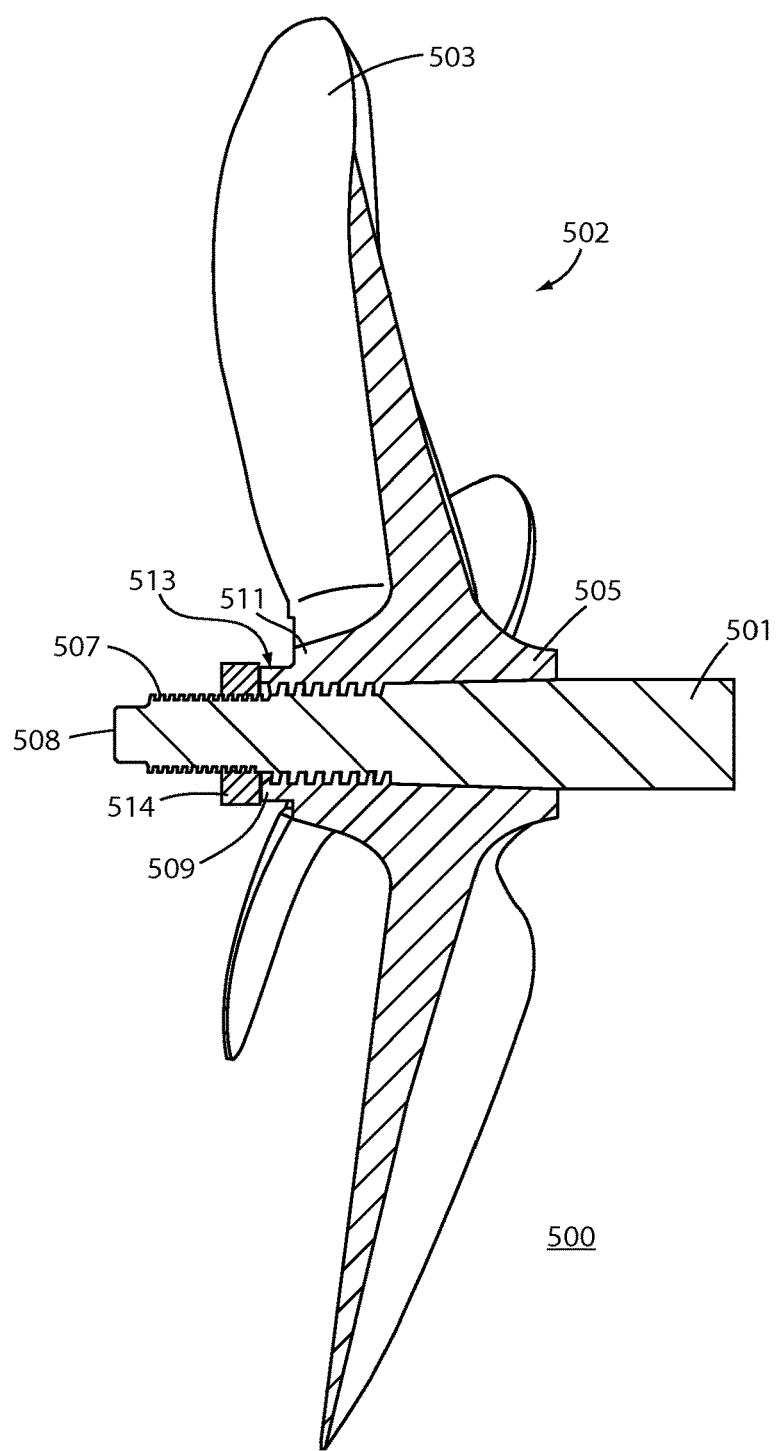
FIG. 5 is a cross-sectional view of the of the marine propulsion assembly.

FIG. 4 is a perspective view of the drive shaft having dual opposing threads used in the marine propulsion assembly. As described herein, the drive shaft includes dual opposing threads as well as a tapered section for use with an accompanying propeller as descried in FIGS. 3A and 3B. FIG. 5 is a cross-sectional view of the of the marine propulsion assembly. With regard to both FIG. 4 and FIG. 5, the marine propeller drive shaft assembly 500 includes a drive shaft 501 and propeller 502. The drive shaft is typically manufactured of various grades of stainless steel stock for preventing corrosion as it is continually exposed to water. Although propeller 502 is shown with four blades 503, those skilled in the art will also recognize that a greater or lesser number of blades may also be used with the drive shaft assembly as described herein.

Each root of the blades 503 are integrated with center hub 505 located at the center of the propeller. As best seen in FIG. 3, a threaded hole and a tapered bore 302 extend though hub 505 and are used to mount the drive shaft 501 with the propeller hub. The shaft 501 includes both a first set of threads 507 and second set of threads 509. The first set of threads 507 and second set of threads 509 are machined such that they are opposed in opposite directions where the first set of threads 507 are a left hand thread and the second set of threads are a right hand thread. In an alternative embodiment, the second set of threads may be tapered in diameter to match threads within a propeller hub. As seen in FIG. 4, although both sets of threads are positioned adjacent to one another, the first set of threads 407 are located adjacent the tip 408 of the shaft 501. The second set of threads 409 are larger in diameter and are positioned between the first set of threads 407 and a tapered section 410 of the drive shaft 501. The tapered section 410 is a "long" taper as compared with the overall length of the shaft and is used for providing a stop as the propeller is engaged on the second set of threads 509. As best seen in FIG. 4, the first set of threads 407 are lesser in diameter and longer in overall length than the second set of threads 409 as the second set of threads 409 need only be long enough to engage with mating threads within the propeller hub.

Specifically with regard to FIG. 5, the propeller is shown having a forward end and aft end where the aft end of the propeller is that side that produces thrust. When assembling the marine propulsion assembly 500, the aft end of the shaft 501 is inserted in the forward end of the hub 505 so that the second set of threads 509 frictionally engage with a mating set of threads inside the hub 505. In use, the second set of threads 509 are machined on the shaft 501 so that the first set of threads 507 protrude and/or extend outside aft of the hub 505 and the installation/dismount nut 513. The first set of threads 507 are typically left handed and sized to engage with at least one keeper nut 514. Those skilled in the art will recognize that the keeper nut 514 may be used in connection with a fairwater cap or other cone shaped device used to cover the keeper nut 514. This can have the effect of improving both appearance and overall hydrodynamic performance of the propulsion system.

As seen in both FIGS. 4 and 5, the diameter of the shaft 501 includes a tapered section 510 for better holding the propeller hub 505 to the shaft 501. The taper of the shaft 501 begins at the forward portion of the threads 509 and extends to the forward face of the hub 505. An increasing diameter of the taper is selected to provide the best fit between shaft 501 and hub 505. Because of the rotational and torsional forces involved, those skilled in the art will also recognize the increased taper of the shaft works to frictionally engage the shaft 501 within the hub 505, for a tighter, stronger and more secure fit than would be possible with the keyway and keyseat system used in the prior art.

In use, the marine propeller drive shaft offers a number of advantages in its use of dual opposing threads and taper to the drive shaft. It offers a better taper fit since no key is needed since one set of threads work to drive propeller up the taper of the shaft while another set of opposing threads are used to secure and tighten a keeper nut against the hub. This embodies a stronger yet more simple design since no key and keyway are needed.

When providing propeller maintenance, no prop puller is needed since the hexagonal nut, integrated in the propeller hub, can be used to easily remove the propeller from the shaft. Thus, the installation or removal of the propeller on the shaft requires only a socket wrench to tighten or loosen the propeller to the shaft. In view of the direction of rotation of the shaft, a left-hand keeper nut, sometimes called a "jam" nut, also works to tighten the propeller to the shaft. Overall, fewer components are used in the drive assembly since no keyway and key are needed. This has the effect of an overall stronger shaft design since no keyway is cut into the shaft to compromise its strength and integrity. Finally, manufacturing processes are greatly simplified and less expensive since no broaching of the propeller is needed to create the keyway in the shaft.

In the foregoing specification, specific embodiments of the present invention have been described. However, one of ordinary skill in the art appreciates that various modifications and changes can be made without departing from the scope of the present invention as set forth in the claims herein. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A marine propulsion assembly comprising:
   at least one propeller having a central hub with a plurality of blades extending outwardly therefrom, the central hub defining a forward end and an aft end, with a bore extending through the hub from the forward end to the aft end, and at least a portion of the bore proximate the aft end having internal propeller threads defining a right hand thread, the aft end of the hub having an outer configuration corresponding to an installation/dismount nut;
   a drive shaft having a forward end and an aft end, and having a first set of threads being in a first direction, threadably engageable with the internal propeller threads, and defining a first thread diameter, and, a second set of threads positioned between the aft end and the first set of threads, the second set of threads being in a second direction, that is in an opposite direction from the first direction, defining a second thread diameter, wherein the second thread diameter is smaller than the first thread diameter;
   a keeper nut threadably engageable with the second set of threads; and
   wherein upon threaded engagement of the internal propeller threads with the first set of threads, the second set of threads extends beyond the aft end of the central hub, and the keeper nut is in threaded engagement second set of threads, and tightened against the aft end of the central hub.

2. The marine propulsion assembly of claim 1, wherein the central hub and the plurality of blades are integrated.

3. The marine propulsion assembly of claim 1, wherein the drive shaft includes a tapered portion between the forward end and the first set of threads, the tapered portion having an increasing diameter in a direction toward the forward end and away from the aft end of the drive shaft.

4. The marine propulsion assembly of claim 3, wherein the tapered portion has a diameter, at a smallest end thereof that is larger than the first thread diameter of the first set of threads.

5. The marine propulsion assembly of claim 3, wherein the central bore further includes a bore tapered portion between the forward end and the internal propeller threads, with the bore tapered portion corresponding to the tapered portion of the shaft whereupon assembly thereof, the bore tapered portion and the tapered portion of the shaft being in abutting engagement along the length thereof.

6. The marine propulsion assembly of claim 1, wherein the installation/dismount nut configuration comprises a hexagonal nut.

7. The marine propulsion assembly of claim 1, wherein the aft end of the drive shaft extends beyond the keeper nut, and wherein the central hub extends around at least a portion of the second set of threads.

* * * * *

UNITED STATES PATENT AND TRADEMARK OFFICE
CERTIFICATE OF CORRECTION

PATENT NO. : 10,239,600 B2
APPLICATION NO. : 14/920004
DATED : March 26, 2019
INVENTOR(S) : Todd Diekevers Page 1 of 1

It is certified that error appears in the above-identified patent and that said Letters Patent is hereby corrected as shown below:

In the Claims

Column 6, Claim 1, Line 14:
After "engagement" insert -- with the --

Signed and Sealed this
Fourteenth Day of May, 2019

Andrei Iancu
*Director of the United States Patent and Trademark Office*